United States Patent [19]

Ota et al.

[11] Patent Number: 5,623,304
[45] Date of Patent: Apr. 22, 1997

[54] CCTV SYSTEM USING MULTIPLEXED SIGNALS TO REDUCE REQUIRED CABLES

[75] Inventors: Kazuo Ota, Sagamihara; Satoshi Soma, Yokohama; Hajime Matsumoto, Yokohama; Takayuki Kimura, Yokohama, all of Japan

[73] Assignee: Matsushita Electric Industrial Co., Ltd., Osaka, Japan

[21] Appl. No.: 311,702

[22] Filed: Sep. 23, 1994

Related U.S. Application Data

[63] Continuation of Ser. No. 586,962, Sep. 24, 1990, abandoned.

[30] Foreign Application Priority Data

Sep. 28, 1989 [JP] Japan ................................ 1-250679

[51] Int. Cl.$^6$ ............................................. H04N 7/18
[52] U.S. Cl. ................... 348/143; 348/212; 348/478; 348/512
[58] Field of Search .................. 358/108, 86; 455/3, 455/5, 6; 348/143, 152, 153, 154, 155, 156, 159, 212, 476, 478, 512, 518, 6, 8, 484, 485, 705

[56] References Cited

U.S. PATENT DOCUMENTS

| | | | |
|---|---|---|---|
| 2,041,456 | 5/1936 | Carlson . | |
| 2,978,538 | 4/1961 | Breese | 348/212 |
| 3,105,873 | 10/1963 | Winston | 358/86 |
| 3,426,145 | 2/1969 | Kimball et al. | 348/705 |
| 3,518,376 | 6/1970 | Kamen et al. | 348/485 |
| 3,749,831 | 7/1973 | Simpkins | 348/460 |
| 3,819,852 | 6/1974 | Wolf | 348/478 |
| 3,916,436 | 10/1975 | Marey et al. | 348/212 |
| 3,946,159 | 3/1976 | Fay | 348/8 |
| 4,148,060 | 4/1979 | Herschberg | 348/485 |
| 4,300,168 | 11/1981 | Kawamura | 348/372 |
| 4,390,901 | 6/1983 | Keiser | 348/478 |
| 4,539,595 | 9/1985 | Warner | 348/212 |
| 4,555,735 | 11/1985 | Usuki et al. | 358/330 |
| 4,714,959 | 12/1987 | Pshtissky | 348/707 |
| 4,787,085 | 11/1988 | Suto | 358/86 |
| 4,818,869 | 4/1989 | Oliver | 358/108 |
| 4,860,101 | 8/1989 | Pshtissky et al. | 348/518 |
| 4,885,747 | 12/1989 | Foglia | 455/3 |
| 4,891,633 | 1/1990 | Imazeki | 358/86 |
| 4,935,924 | 6/1990 | Baxter | 358/86 |
| 4,956,862 | 9/1990 | Robbins et al. | 348/6 |
| 4,959,713 | 9/1990 | Morotomi et al. | 358/156 |
| 5,019,905 | 5/1991 | Pshtissky et al. | 348/159 |
| 5,202,759 | 4/1993 | Laycock | 348/152 |

FOREIGN PATENT DOCUMENTS 2022963  12/1979  United Kingdom .

OTHER PUBLICATIONS

Single Wire Deep Submergence Television System, By A. W. Vigil, May 1973.

Primary Examiner—Thai Q. Tran
Assistant Examiner—Bryan S. Tung
Attorney, Agent, or Firm—Watson Cole Stevens Davis, P.L.L.C.

[57] ABSTRACT

A cable-saving type CCTV system for transmitting a multiplexed video signal over a single coaxial cable connecting a camera site and a control site by frequency-modulating a bi-directional audio signal and producing a digital control signal and a digital alarm signal and multiplexing the resultant signals and an external synchronizing signal in a blanking period of the video signal.

10 Claims, 5 Drawing Sheets

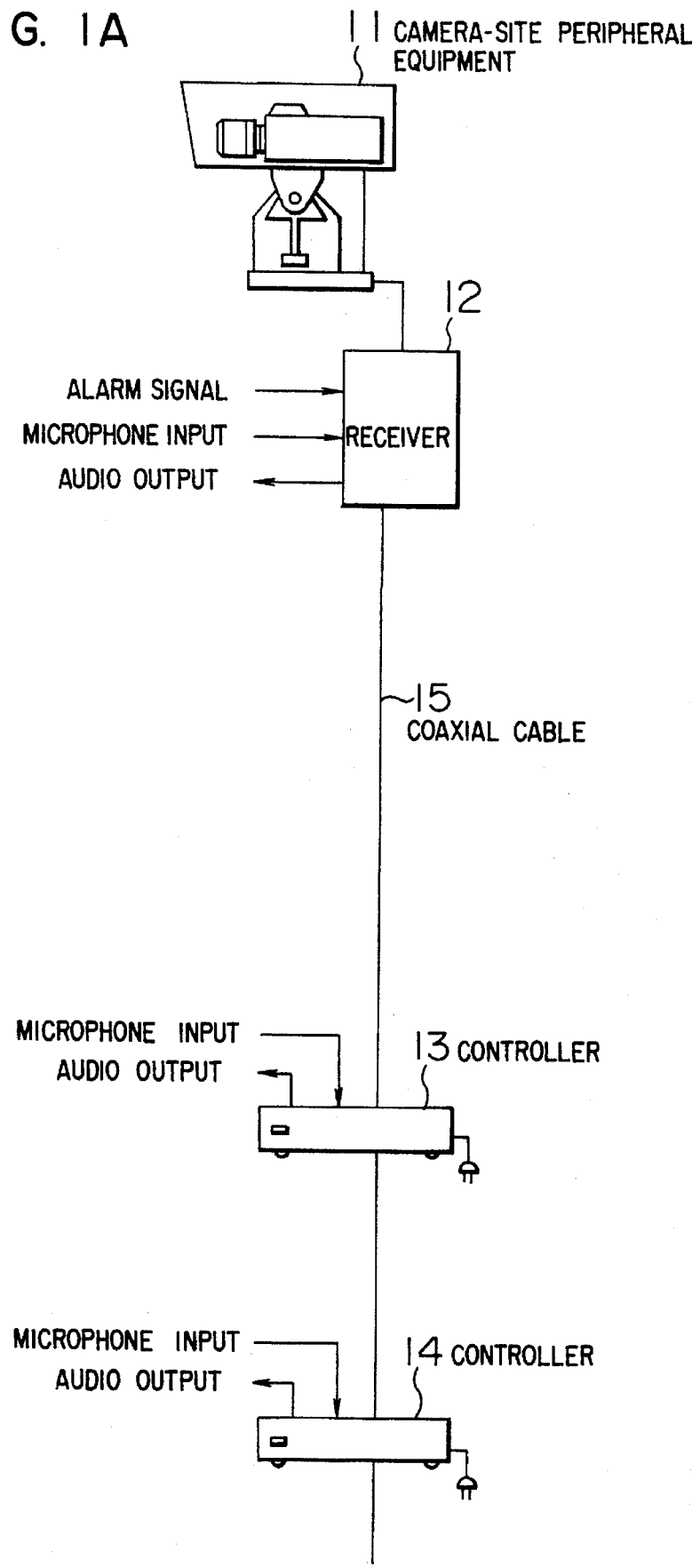

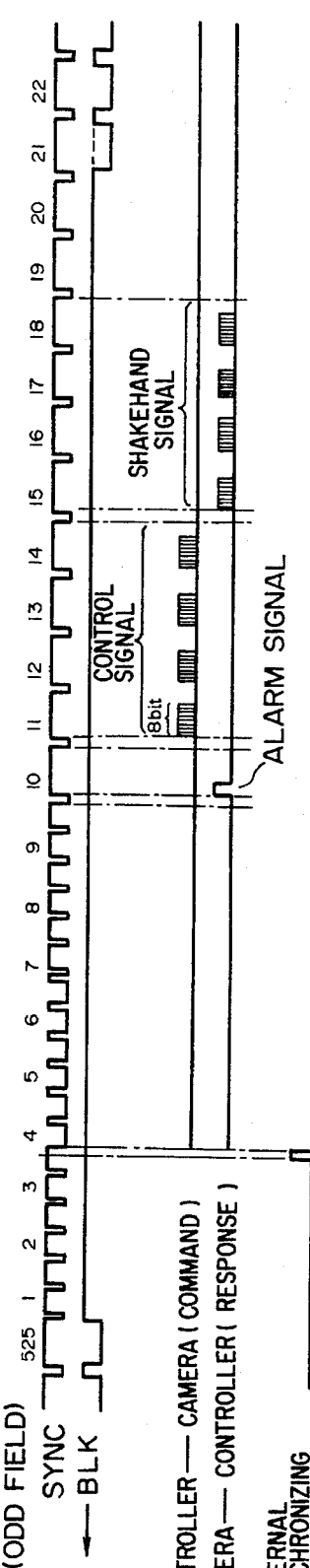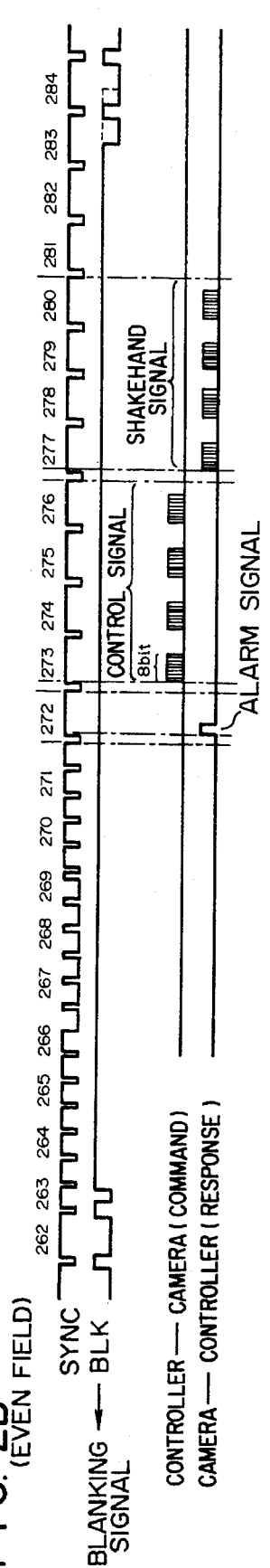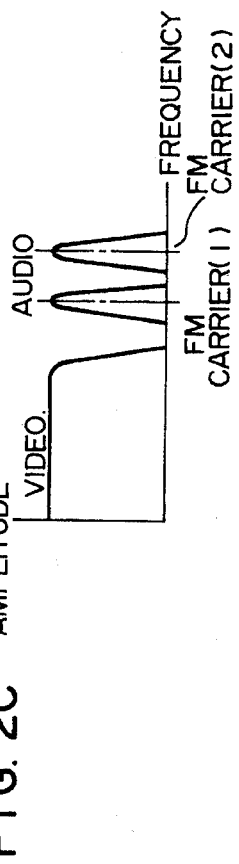

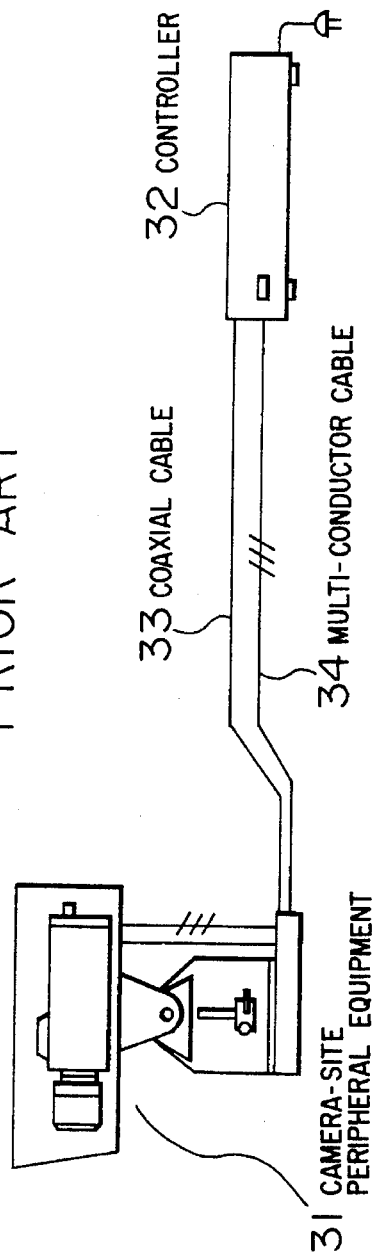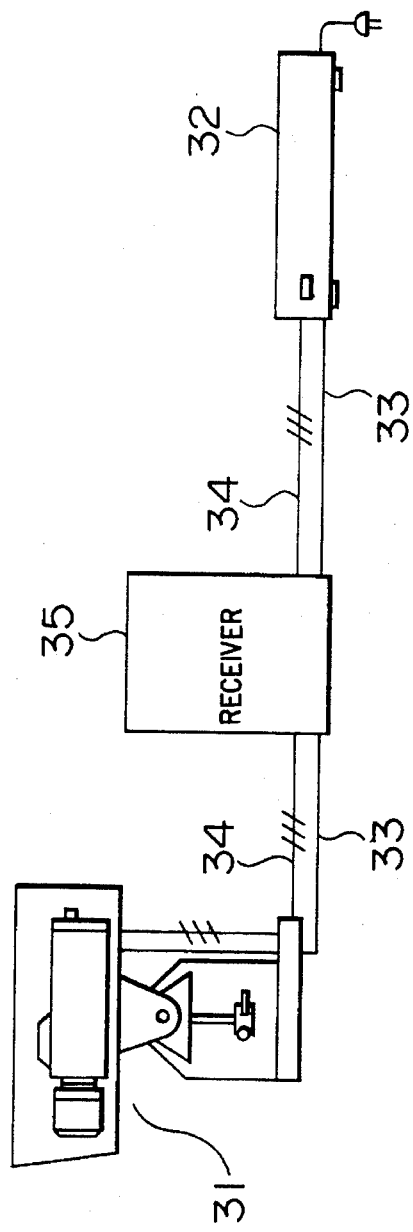

5,623,304

CCTV SYSTEM USING MULTIPLEXED SIGNALS TO REDUCE REQUIRED CABLES

This application is a continuation of application Ser. No. 07/586,962, filed Sep. 24, 1990 (abandoned).

BACKGROUND OF THE INVENTION

This invention relates to a system for controlling camera-site equipment from a plurality of control sites in the field of monitoring and surveillance, and more particularly to a centralized control system for equipment at the control sites from a master controller at a control site.

FIGS. 3 and 4 are block diagrams of a system for controlling camera-site peripheral equipment in a conventional closed circuit television system (hereafter referred to CCTV). FIG. 3 shows a direct control method, while FIG. 4 shows an indirect control method. In FIGS. 3 and 4, reference numeral 31 denotes peripheral equipment at the camera site, 32 denotes a controller for controlling the camera-site equipment, 33 denotes a coaxial cable, 34 denotes a multi-conductor cable, and 35 denotes a receiver for receiving signals from the controller 32 and sending signals to the camera-site equipment.

The control system of FIG. 3 is of the direct control method, and sends signals and electric power in accordance with the control function of the controller 32 directly to the camera-site peripheral equipment through the multi-conductor cable 34. The control system of FIG. 4, which is of the indirect control system type and used where the controller 32 and the camera-site peripheral equipment are remote from each other, performs ON/OFF control of relay contacts (not shown) of the receiver 35 through the multi-conductor cable 34, and controls sending of necessary signals and electric power through the multi-conductor cable 34 to the camera-site peripheral equipment 31 in accordance with ON/OFF actions of the relay contacts of the receiver 35. Video signals from the camera are transmitted through the coaxial cable 33 to the controller 32.

In the above-mentioned systems, a multi-conductor cable is required for controlling the peripheral equipment, and in addition, when bi-directional voice information and unidirectional alarm information from the camera site are required, separate cables need to be provided for the speech communication and alarm transmission circuits. FIG. 5 is a block diagram of the conventional CCTV including speech communication and alarm transmission circuits. In FIG. 5, reference numerals 31 to 35 denote the same parts as shown in FIGS. 3 and 4. In FIG. 5, however, alarm information from the camera site is inputted into the receiver 35, and through the intermediary of the receiver 35, the alarm information is transmitted to the controller 32 by means of the multi-conductor cable 34. Reference numerals 36, 39 denote microphones, 37, 40 denote amplifiers for increasing the strength of voice input signals, and 38, 41 denote speakers. In this way, the voice signals are transmitted in two directions.

However, in the conventional systems, a video signal, bi-directional voice signal, control signal, alarm signal, and external synchronizing signal are transmitted through separate individual circuits. Therefore, in installing a control system, many cables have to be laid between the devices, making the installation work complicated and thus causing a large total installation cost. In addition, when the video signal processing unit and the camera-side control unit are in mixed form of a control system in the control site, those units cannot be operated centrally, so that control operation of them is difficult.

SUMMARY OF THE INVENTION

This invention has been made to solve the above problem, and has as its object to provide a CCTV system of a cable-saving type.

According to an aspect of this invention, there is provided a cable-saving type CCTV system comprising camera-site equipment, control-site means, and signal processing means for transmitting, between the camera-site equipment and control-site means, a multiplexed signal containing at least a sub signal superposed on a main signal formed of a video signal, the signal processing means including a coaxial cable for transmission of the multiplexed signal, means for multiplexing the sub signal and the main signal, and means for separating and the sub signal from the multiplexed signal.

According to this invention, the camera site and the control site can be connected by a single coaxial cable, so that redundant cables between the units can be eliminated and saved, which makes the installation work and control operation easy.

BRIEF DESCRIPTION OF THE DRAWINGS

FIGS. 1A and 1B show the composition of the cable-saving CCTV system according to an embodiment of this invention;

FIGS. 2A, 2B, and 2C are timing charts of various signals time division multiplexed and transmitted over a coaxial cable in the case of NTSC signals according to the embodiment of this invention;

FIGS. 3 and 4 are block diagrams of conventional CCTV systems; and

DESCRIPTION OF THE PREFERRED EMBODIMENTS

Figure 1B:
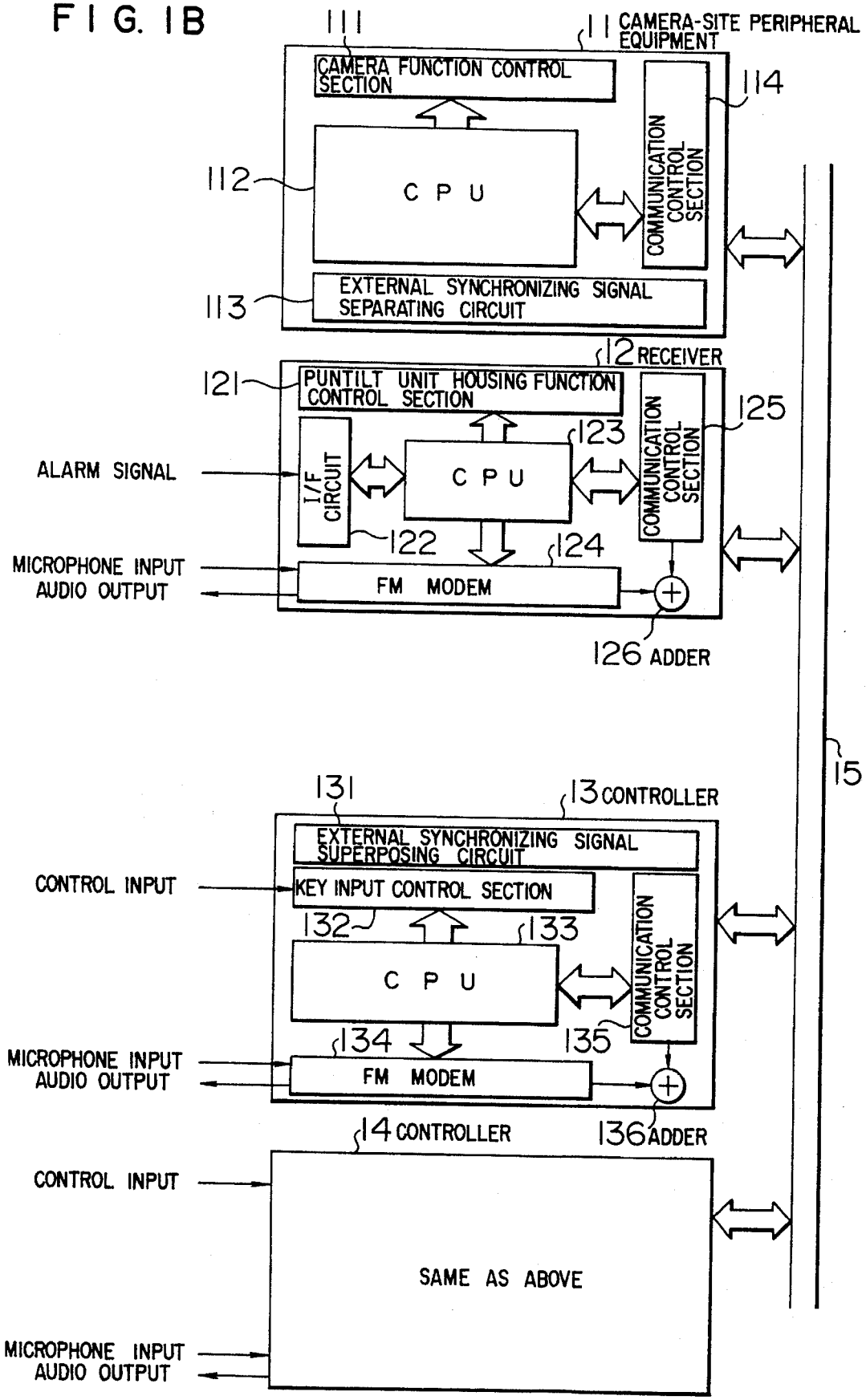
Figure 5:
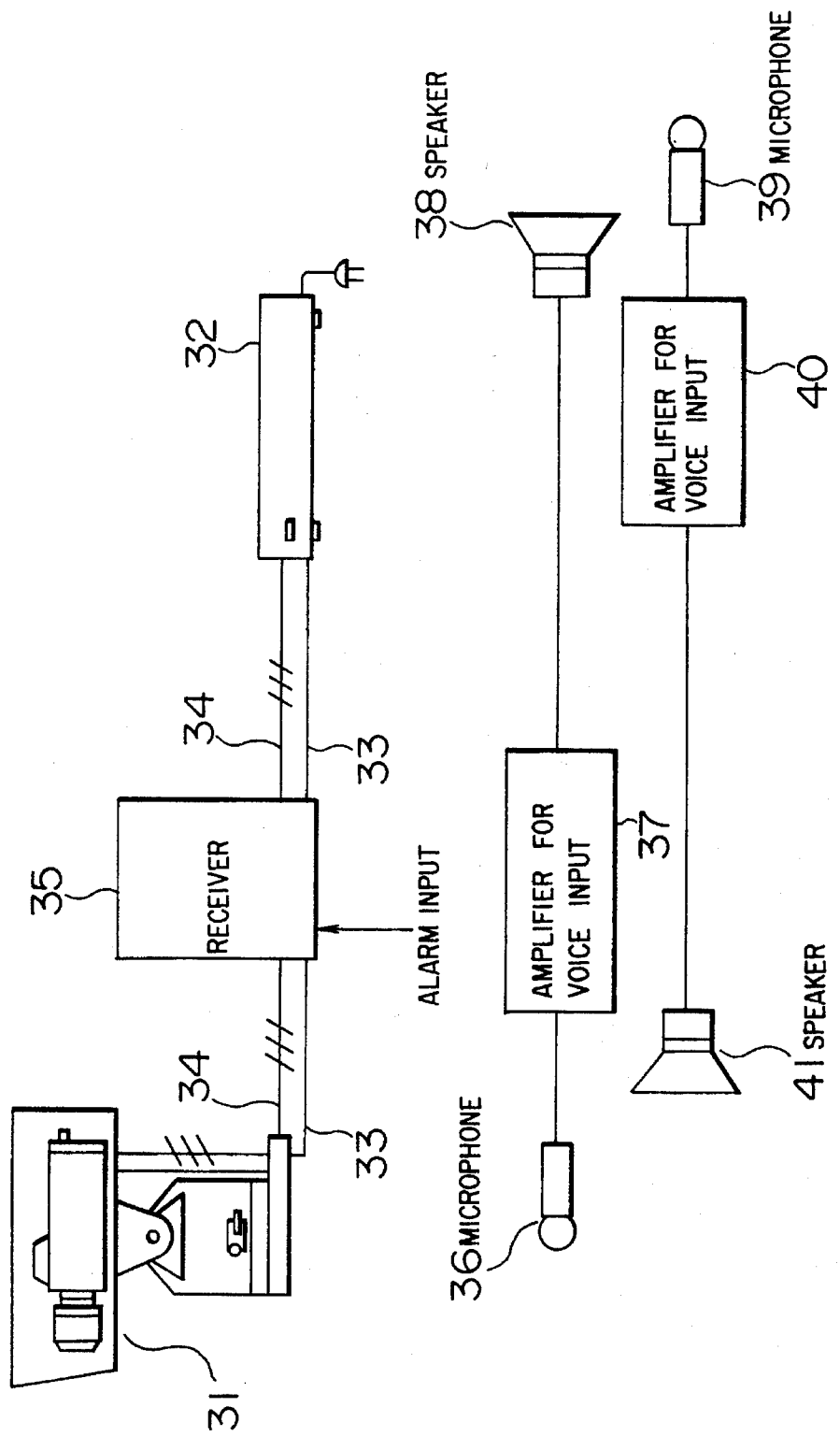
FIG. 5 is a block diagram of a conventional CCTV system including voice and alarm transmission circuits.

FIGS. 1A and 1B show the composition of the cable-saving type CCTV system according to an embodiment of this invention. FIG. 1A shows a system configuration, while FIG. 1B shows its block diagram. In those figures, camera-site peripheral equipment 11 comprises a camera function control block 111, a CPU 112, an external synchronizing signal separating circuit 113, and a communication control block 14. A receiver 12 comprises a puntilt unit housing function control block 121, an I/F circuit 122 for receiving an alarm signal, a CPU 123, an FM modem 124 with a microphone input and an audio output, a communication control block 125, and an adder 126. Reference numerals 13, 14 denote controllers, each comprising an external synchronizing signal superposing circuit 131, a key input control block 132, a CPU 133, an FM modem 134 with a microphone input and an audio input, a communication control block 135, and an adder 136.

The operation of the above embodiment will be described. In the above embodiment, at the camera site, a bi-directional audio signal is inputted through the microphone input into the receiver 12, while at the control site, a bi-directional audio signal is likewise inputted through the microphone input into the controllers 13, 14. The inputted audio signal is frequency-modulated by the FM modems 124, 134 and multiplexed with a video signal (generated by the camera and transmitted over the coaxial cable). The multiplexed signal is passed through the communication control blocks 125, 135 and transmitted over the coaxial cable 15. The multiplexed signal is then demodulated to an audio signal by the FM modem 124, 134 in the receiver 12 and the controller 13 or 14. On the other hand, an alarm signal is inputted through the I/F circuit 122 of the receiver 12 and control signals are inputted through the key input control blocks 132 of the controllers 13, 14, and those signals are sent to the CPU 123 and the CPU 133, where those signals are superposed as pulse signals in each vertical blanking period of the video signal. The CPU performs the following functions: (1) controls inputs of an alarm signal, a key operation signal, etc.; (2) exchanges signals with the electronic circuit (gate array) in the communication control block 135, multiplexes resultant signals in a specified area (blanking period), and demodulates (decode) and outputs such multiplexed signals. In other words, CPU 123 and CPU 133 each controls the formation of serial signals by multiplexing, while CPU 112 controls the formation of parallel signals for control of various pieces of the camera-site equipment from the serial signals; (3) performs communication control to enable the operations of (1) and (2) in synchronized manner as a system over the single coaxial cable connected between the devices. FIGS. 2A, 2B, and 2C show examples of superposition of various signals transmitted over a coaxial cable when NTSC (National Television System Committee) signals are used.

FIG. 2A shows the control signal, alarm signal, shakehand signal, and external synchronizing signal, which are multiplexed in an odd field of the video signal. The BLK denotes a blanking signal portion. Synchronized with the 11th through 14th SYNC pulses during a blanking period, control signals, each formed of four 8-bit pulse signals, are transmitted from the controller to the receiver or the camera-site equipment. Likewise, an alarm signal is received by a sensor such as an inflared detector (not shown) and supplied into the receiver, where the alarm signal is multiplexed to the video signal. The multiplexed signal is transmitted to the controller and used to operate the camera with respect to the object under surveillance. Synchronized with the 15th through 18th SYNC pulses in a blanking period, a shakehand signal, composed of four 8-bit pulse signals, for confirming that the receiver or the camera-site equipment received a control signal correctly is transmitted to the controller. At the falling edge of the third SYNC pulse (i.e., edge of the 3rd horizontal line portion) in the blanking period, an external synchronizing signal is multiplexed to the video signal. FIG. 2B is a timing chart of the above-mentioned various signals multiplexed in an even field period of the video signal. FIG. 2C shows the bi-directional audio multiplexing method, and indicates the relation between the video signal band, and FM carriers (1), (2) for transmission of bi-directional audio signals by microphone input into the receiver 12 or the controller 13.

An alarm signal transmitted from the receiver 12 is decoded by the controllers 13, 14 and converted into a H(high)/L(Low) signal, while control signals transmitted from the controllers 13, 14 are converted from serial into parallel signals by the receiver 12 or the camera-site peripheral equipment.

An external synchronizing signal is generated, multiplexed and transmitted by the external-synchronizing-signal superposing circuits 131 of the controllers 13, 14. And, the transmitted external-synchronizing-signal is separated synchronously by the external synchronizing signal separating circuit 113 in the camera-site peripheral equipment 11 so as to synchronize a plurality of cameras connected to the controllers 13, 14.

Various forms of controls can be effected on the devices in the control sites, such as image processing devices including a multi-picture unit and a frame switcher (not shown) by use of control signals superposed and transmitted over a single coaxial cable.

We claim:

1. A closed circuit television system comprising:

(a) a single cable for transmitting signals;

(b) camera-site equipment, connected to said cable, comprising:
an external sync signal separation circuit for receiving a first composite signal through said cable and extracting an external sync signal from said first composite signal, and
a video camera for providing a video composite signal in the NTSC television standard onto said cable;

(c) at least one control-site means, operatively associated with said camera-site equipment through said cable, comprising:
input means for inputting a digital control signal for controlling said camera-site equipment,
means for generating and outputting said external sync signal which is used to synchronize operation of said video camera with another video camera,
first audio signal control means for (i) receiving a first audio signal inputted externally and outputting a first frequency modulated audio signal based thereon in a first modulated frequency band and (ii) receiving a second composite signal transmitted over said cable and demodulating a second frequency modulated audio signal from said second composite signal, and
first multiplex means for multiplexing said external sync signal, said control signal and said first frequency modulated audio signal to form said first composite signal and outputting said first composite signal onto said cable, wherein said control signal is placed in and transmitted in a first predetermined time area of a vertical blanking period of said video signal transmitted through said cable and said external sync signal is placed and transmitted in a second predetermined time area of said vertical blanking period of said video signal transmitted through said cable;

(d) signal processing means, operatively associated with said camera-site equipment and said control-site means through said cable, comprising:
alarm interface means for receiving a digital alarm signal inputted externally which is to be transmitted to said control-site means,
second audio signal control means for (i) receiving a second audio signal and outputting said second frequency modulated signal in a second modulated frequency band and (ii) receiving said first composite signal from said control-site means and demodulating said first frequency modulated audio signal from said first composite signal,
means for receiving said first composite signal, detecting said digital control signal and generating a confirmation signal, in response to said digital control signal, to confirm that said control signal has been properly received, and
second multiplex means for receiving said video signal transmitted through said cable and adding said alarm signal, said confirmation signal and said second frequency modulated audio signal to said video signal to form said second composite signal to be transmitted to said control-site means, wherein said alarm signal is superposed on said video signal in a third predetermined time area of said vertical blanking period of said video signal and said confirmation signal is superposed on said video signal in a fourth predetermined time area of said vertical blanking period of said video signal.

2. A closed circuit television system according to claim 1, wherein said input means comprises a keyboard.

3. A closed circuit television system according to claim 1, wherein said first audio signal control means comprises a frequency modulation modem having a carrier frequency higher than an original frequency band of said video signal.

4. A closed circuit television system according to claim 1, wherein said second audio signal control means comprises a frequency modulation modem.

5. A closed circuit television system according to claim 4, wherein said first audio signal control means comprises a frequency modulation modem, and a carrier frequency of said frequency modulation modem of said camera-site equipment is different from a carrier frequency of said frequency modulation modem of said first audio signal control means.

6. A closed circuit television system comprising:

camera site equipment having at least one video camera for generating a video composite signal in the NTSC standard;

at least one control-site means including means for generating an external sync signal for synchronizing operation of said video camera with another control-site means, control means for producing a digital control signal to control said video camera, and audio input/output means including an FM modem for modulating/demodulating an audio signal; and a single cable connecting said camera site equipment and said at least one control-site means to transmit therethrough and therebetween the video signal in the NTSC standard generated by said camera;

wherein:
said camera site equipment comprises means for receiving a first composite signal, detecting said digital control signal and generating a confirmation signal, in response to said digital control signal, to confirm that said digital control signal has been properly received and transmitting through said cable said confirmation signal in a first predetermined time area of a vertical blanking period of the transmitted video signal in the NTSC standard, and said control means transmits through said cable said generated external sync signal in a second predetermined time area of said vertical blanking period and said digital control signal in a third predetermined time area of said vertical blanking period and transmits through said cable said audio signal modulated by said FM modem.

7. A closed circuit television system comprising:

camera site equipment having at least one video camera for generating a video signal in the NTSC standard;

at least one control-site means including means for generating an external sync signal for synchronizing operation of said video camera with another camera, control means for producing a digital control signal to control said video camera, and audio input/output means including an FM modem for modulating/demodulating an audio signal; and a single cable for operatively connecting said camera-site equipment and said control-site means to transmit therethrough and therebetween the video signal in the NTSC standard generated by said camera;

wherein:
said camera site equipment comprises means for receiving a first composite signal, detecting said digital control signal and generating a confirmation signal, in response to said digital control signal, to confirm that said digital control signal has been properly received and transmitting through said cable said confirmation signal in a first predetermined time area of a vertical blanking period of the transmitted video signal in the NTSC standard, and said control means transmits through said cable said generated external sync signal in a second predetermined time area of said vertical blanking period and said digital control signal in a third predetermined time area of said vertical blanking period and transmits through said cable said audio signal modulated by said FM modem.

8. A closed circuit television system comprising:

camera site equipment having at least one video camera for generating a video signal in the NTSC standard;

a plurality of control-site means each including means for generating an external sync signal for synchronizing operations of said plurality of control-site means, control means for producing a digital control signal to control said video camera, and audio input/output means including an FM modem for modulating/demodulating an audio signal; and a single cable for operatively connecting said video camera and said plurality of control-site means to transmit therethrough and therebetween the video signal in the NTSC standard generated by said video camera;

wherein:
said camera site equipment comprises means for receiving a first composite signal, detecting said digital control signal and generating a confirmation signal, in response to said digital control signal, to confirm that said digital control signal has been properly received and transmitting through said cable said confirmation signal in a first predetermined time area of a vertical blanking period of the transmitted video signal in the NTSC standard, said control means transmits through said cable said generated external sync signal in a second predetermined time area of said vertical blanking period and said digital control signal in a third predetermined time area of said vertical blanking period and transmits through said cable said audio signal modulated by said FM modem, and each of said control-site means includes means for receiving said confirmation signal.

9. A closed circuit television system comprising:

camera-site equipment having a plurality of video cameras each for generating a video signal in the NTSC standard;

a plurality of control-site means each including (i) means for generating an external sync signal for synchronizing operations of said video cameras, (ii) control means for producing a digital control signal to control at least one of said video cameras, and (iii) audio input/output means including an FM modem for modulating/demodulating an audio signal; and a single cable for operatively connecting said plurality of cameras of said camera-site equipment and said plurality of control-site means, said cable for transmitting therethrough and therebetween the respective video signals in the NTSC standard generated by each of said cameras;

wherein said camera site equipment comprises means for receiving a first composite signal, detecting said digital control signal and generating a confirmation signal, in response to said digital control signal, to confirm that said digital control signal has been properly received and transmitting through said cable said confirmation signal in a first predetermined time area of a vertical blanking period, each of said control means transmits, through said cable, its respective external sync signal in a second predetermined time area of said vertical blanking period and its respective digital control signal in a third predetermined time area of said vertical blanking period, and transmits, through said cable, said audio signal modulated by the FM modem associated with said each of said control means, and each of said control-site means includes means for receiving said confirmation signal.

10. A closed circuit television system comprising:

camera-site equipment having at least one video camera for generating a video signal in the NTSC standard;

at least one control-site means including control means for producing a control signal to control said video camera and audio input/output means including an FM modem for modulating/demodulating an audio signal; and a single cable for operatively connecting said camera-site equipment and said control-site means to transmit therethrough and therebetween the video signal in the NTSC standard generated by said camera;

wherein:
said camera site equipment comprises means for receiving a first composite signal, detecting said digital control signal and generating a confirmation signal, in response to said control signal, to confirm that said control signal has been properly received and transmitting through said cable said confirmation signal in a first predetermined time area of a vertical blanking period, and said control means produces a composite video signal by multiplexing said control signal in a second predetermined time area of said blanking period of the video signal in the NTSC standard transmitted through said cable to provide a resultant multiplexed video signal and by multiplexing said resultant multiplexed video signal with said audio signal modulated by said FM modem to produce said composite video signal for transmission through said cable between said control-site means and said camera-site equipment.

* * * * *